United States Patent
Tanaka et al.

(10) Patent No.: US 10,579,164 B2
(45) Date of Patent: Mar. 3, 2020

(54) ELECTRONIC PEN AND ELECTRONIC PEN MAIN BODY SECTION

(71) Applicant: Wacom Co., Ltd., Saitama (JP)

(72) Inventors: Kohei Tanaka, Tokyo (JP); Kenichi Ninomiya, Kanagawa (JP); Takenori Kaneda, Tochigi (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/164,458

(22) Filed: Oct. 18, 2018

(65) Prior Publication Data

US 2019/0179434 A1 Jun. 13, 2019

(30) Foreign Application Priority Data

Dec. 11, 2017 (JP) ................. 2017-236679

(51) Int. Cl.
| | |
|---|---|
| *G06F 3/033* | (2013.01) |
| *G06F 3/0354* | (2013.01) |
| *G06F 3/041* | (2006.01) |
| *G06F 3/044* | (2006.01) |
| *G06F 3/046* | (2006.01) |
| *G06F 3/038* | (2013.01) |

(52) U.S. Cl.
CPC ........ *G06F 3/03545* (2013.01); *G06F 3/0383* (2013.01); *G06F 3/044* (2013.01); *G06F 3/046* (2013.01); *G06F 3/0416* (2013.01); *G06F 3/04162* (2019.05); *G06F 3/0442* (2019.05)

(58) Field of Classification Search
CPC .. G06F 3/03545; G06F 3/0383; G06F 3/0416; G06F 3/04162; G06F 3/044; G06F 3/0442; G06F 3/046
See application file for complete search history.

(56) References Cited

U.S. PATENT DOCUMENTS

| | | | | |
|---|---|---|---|---|
| 2008/0257613 | A1* | 10/2008 | Katsurahira | ........ G06F 3/03545 178/19.04 |
| 2009/0114459 | A1* | 5/2009 | Fukushima | ......... G06F 3/03545 178/19.03 |

FOREIGN PATENT DOCUMENTS

| | | |
|---|---|---|
| JP | 2011186803 A | 9/2011 |
| JP | 2013161307 A | 8/2013 |
| JP | 5959038 B1 | 8/2016 |

* cited by examiner

*Primary Examiner* — Insa Sadio
(74) *Attorney, Agent, or Firm* — Seed IP Law Group LLP

(57) ABSTRACT

An electronic pen includes an electronic pen main body section coupled to a side of a housing that includes an opening. The electronic pen main body section includes: an axial portion that is put into a hollow portion of the housing via the opening; and a tip portion that is coupled to the axial portion and externally exposed from the opening of the housing. A diameter of the tip portion is larger than a diameter of the opening of the housing. A coupling side of the tip portion includes a second ring-shaped end face that comes into contact with a first ring-shaped end face on the side of the housing that includes the opening. The electronic pen main body section includes a stepped portion on a coupling area between the tip portion and the axial portion.

18 Claims, 8 Drawing Sheets

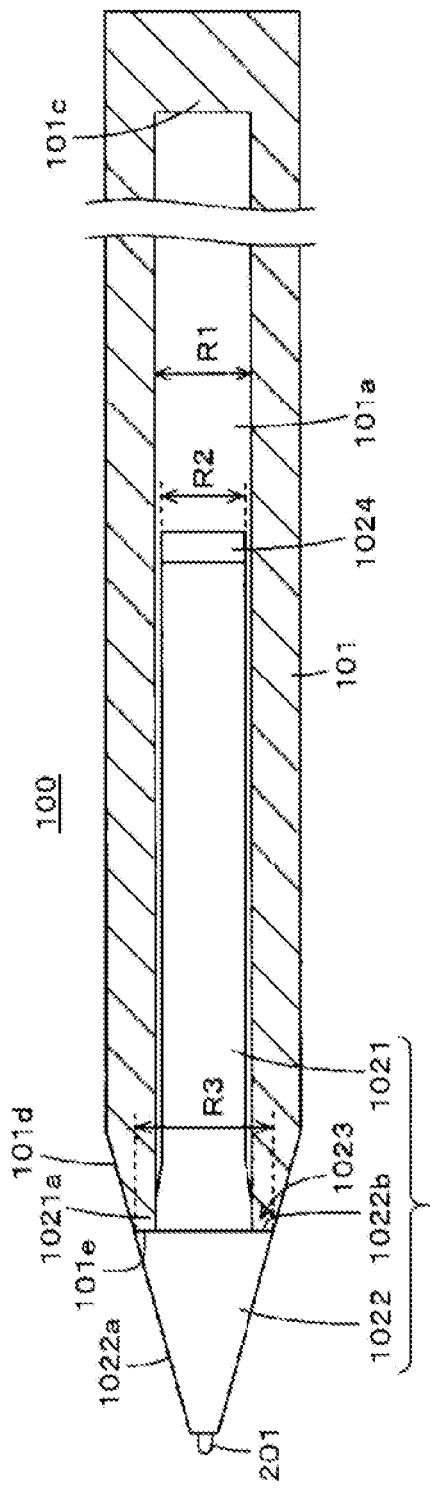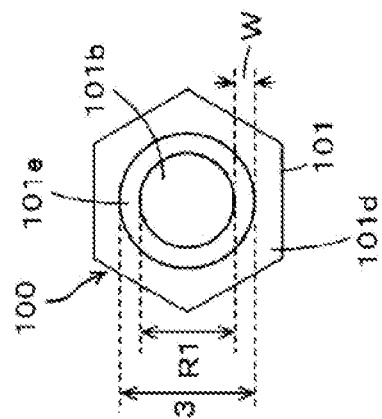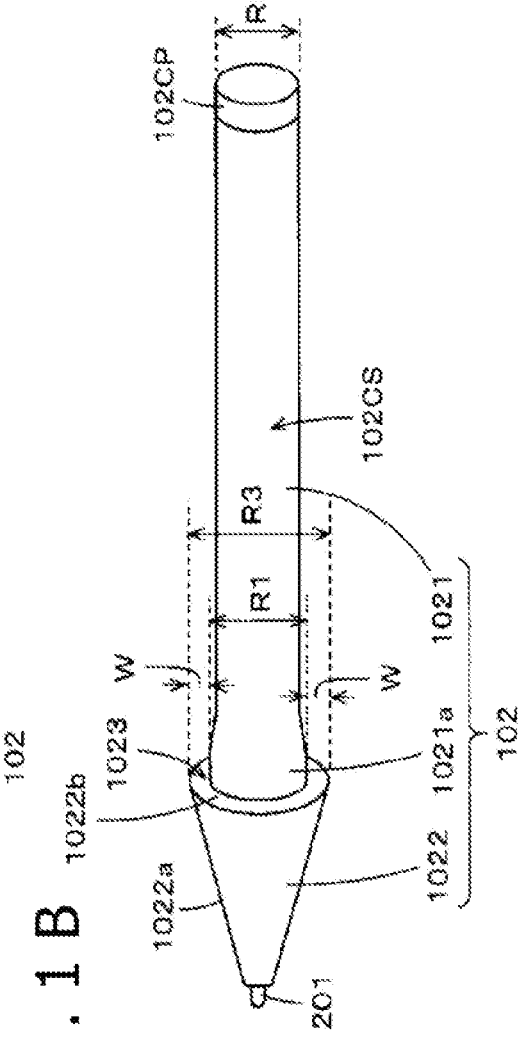

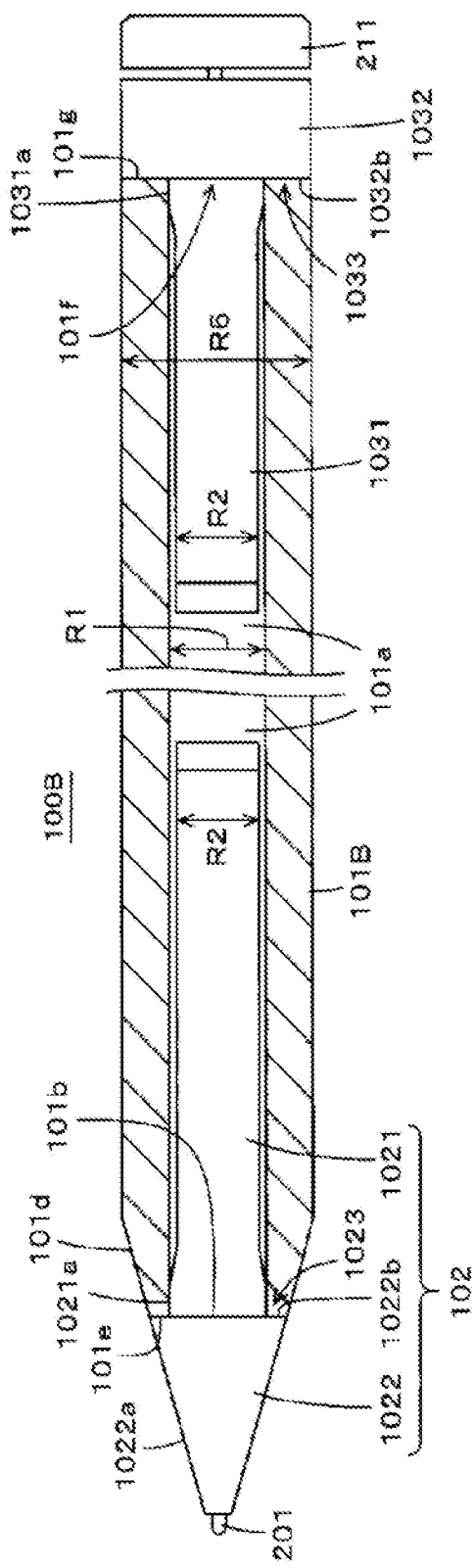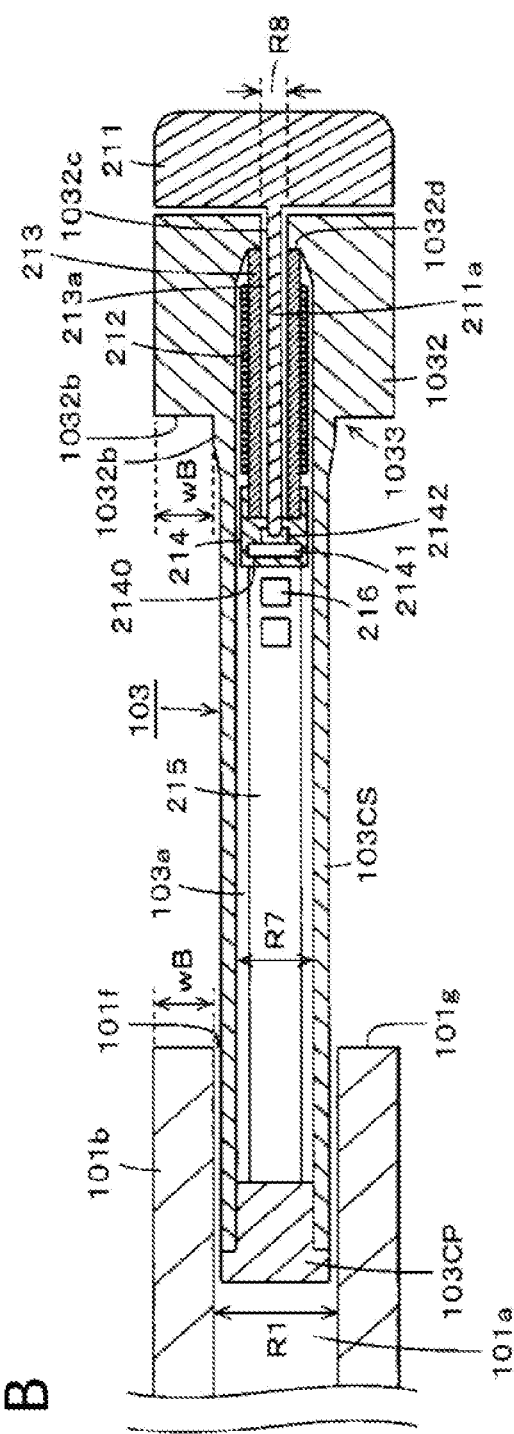
FIG. 4A
FIG. 4B

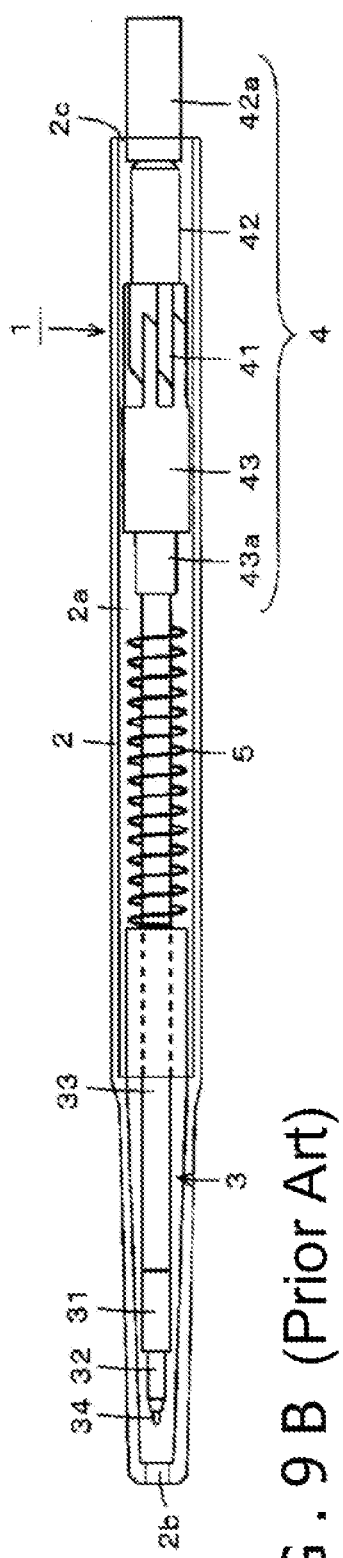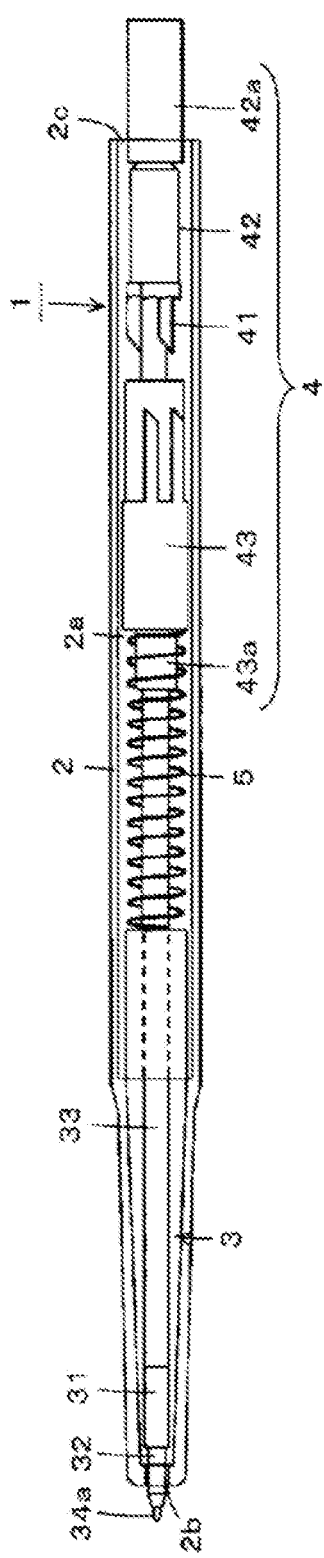
FIG. 9A (Prior Art)
FIG. 9B (Prior Art)

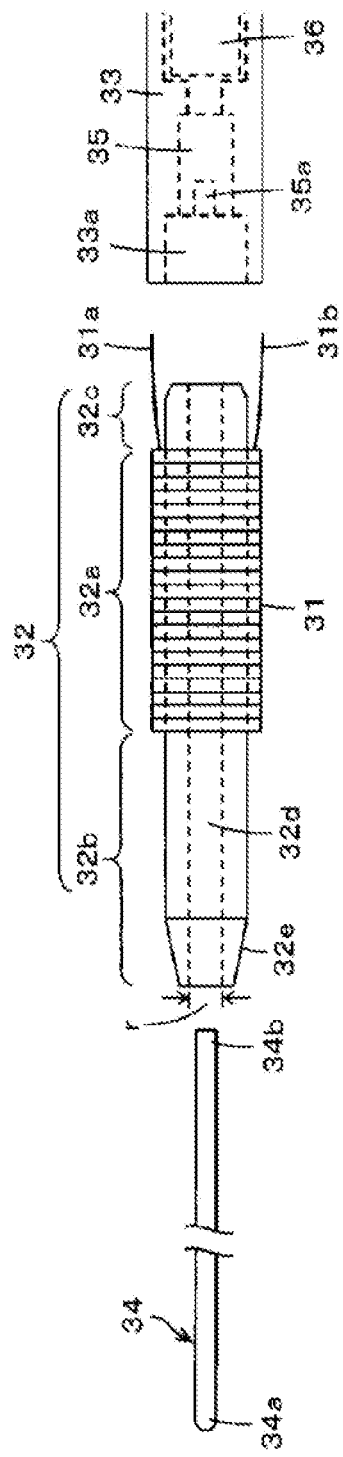
F I G. 1 0 A (Prior Art)
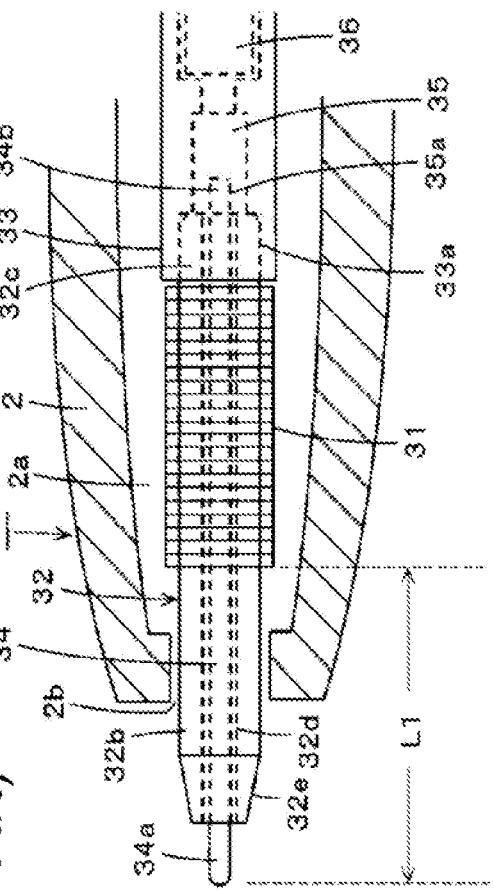
F I G. 1 0 B (Prior Art)

ELECTRONIC PEN AND ELECTRONIC PEN MAIN BODY SECTION

CROSS-REFERENCE TO RELATED APPLICATION

This application claims the priority of Japanese Patent Application No. 2017-236679 filed Dec. 11, 2017, which is incorporated herein by reference.

BACKGROUND

Technical Field

The present disclosure relates to an electronic pen and an electronic pen main body section that are used together with a position detector.

Background Art

An electronic pen accommodates, in a hollow portion of a tubular housing, electronic pen component members included in the electronic pen. The electronic pen component members of an electromagnetic induction electronic pen include at least a coil wound around a ferrite core as an example of a magnetic core and a capacitor that is included in a resonance circuit and connected in parallel to the coil. The electronic pen component members of an active capacitive electronic pen include at least a conductive refill body and a signal generation circuit that generates a position detection signal. The position detection signal is sent through the refill body.

The applicant has proposed an electronic pen having electronic pen component members as an electronic pen main body section that comes in a cartridge form (refer to Patent Document 1 (refer to Japanese Patent No. 5959038)).

FIGS. 9A and 9B are diagrams illustrating a configuration example of an electronic pen disclosed in Patent Document 1. An electronic pen 1 in this example has a knocking-type configuration in which an electronic pen main body section 3 is accommodated in a hollow portion 2a of a tubular housing 2 and a pen tip side of the electronic pen main body section 3 slides into and out of a side of an opening 2b at one longitudinal end of the housing 2 by a knocking cam mechanism section 4. The electronic pen main body section 3 of the electronic pen 1 in this example has a cartridge-type configuration and is attachable to and detachable from the housing 2.

FIG. 9A illustrates a state in which the electronic pen main body section 3 as a whole is accommodated in the hollow portion 2a of the housing 2, and FIG. 9B illustrates a state in which the pen tip side of the electronic pen main body section 3 is caused to project from the opening 2b of the housing 2 by the knocking cam mechanism section 4. In the example illustrated in FIGS. 9A and 9B, the housing 2 of the electronic pen 1 includes transparent synthetic resin, and the inside of the housing 2 is visible. The electronic pen 1 in this example is compatible with commercial knocking-type ballpoint pens.

The housing 2 and the knocking cam mechanism section 4 provided inside the housing 2 have not only the same configuration as known commercial knocking-type ballpoint pens but also the same dimensional relationship. In other words, a commercial knocking-type ballpoint pen housing and a knocking cam mechanism section can also be used as the housing 2 and the knocking cam mechanism section 4 in an 'as-is' manner.

The knocking cam mechanism section 4 has a known configuration in which a cam main body 41, a knocking rod 42, and a rotor 43 are assembled together as illustrated in FIGS. 9A and 9B. The knocking rod 42 has an end portion 42a that projects from an opening 2c of the housing 2 on the side opposite to the pen tip side. The rotor 43 includes a fitting section 43a to which the end portion of the electronic pen main body section 3 on the side opposite to the pen tip side is fitted.

In the electronic pen main body section 3, a magnetic core around which a coil 31 is wound, and in this example, a ferrite core 32, is coupled with a tubular body section 33. FIG. 10A is an exploded enlarged view of the ferrite core 32 around which the coil 31 is wound, part of the tubular body section 33, and a portion of a refill body 34, and FIG. 10B is an enlarged view of the pen tip side of the electronic pen 1 in the state illustrated in FIG. 9B.

As illustrated in FIGS. 9A and 9B and FIGS. 10A and 10B, the refill body 34 is inserted through a through hole 32d of the ferrite core 32, and an end portion 34b on the inserted side is fitted into a pen pressure detection section 35 provided inside the tubular body section 33 so that the end portion 34b is provided as part of the electronic pen main body section 3. As illustrated in FIG. 10B, an end portion 34a of the refill body 34 on the side opposite to the end portion 34b projects from the ferrite core 32 as a pen tip.

When the ferrite core 32 is viewed in the axial direction thereof, an area from the end portion on the pen tip side to one end of a coil winding section 32a is a first non-coil-winding section 32b around which no coil is wound. A small area from other end of the coil winding section 32a to the side of a coupling area of the ferrite core 32 with the tubular body section 33 is a second non-coil-winding section 32c around which the coil 31 is not wound.

A diameter of the ferrite core 32 is selected to be smaller than that of the opening 2b of the housing 2. However, the diameter of the coil winding section 32a is larger than that of the opening 2b of the housing 2 to provide a configuration compatible with commercial knocking-type ballpoint pens. As a result, the portion of the pen tip side of the first non-coil-winding section 32b can project externally from the opening 2b of the housing 2 as illustrated in FIG. 10B. The second non-coil-winding section 32c is used for coupling with the tubular body section 33.

A pen pressure detection section 35 is provided near the coupling area of the ferrite core 32 with the tubular body section 33 of the electronic pen main body section 3. A printed circuit board 36 is further accommodated in the tubular body section 33. A capacitor included in a resonance circuit and connected in parallel with the coil 31 is provided on the printed circuit board 36.

In the state illustrated in FIG. 9A, when the end portion 42a of the knocking rod 42 is pressed down, the electronic pen main body section 3 is locked in the state illustrated in FIG. 9B inside the housing 2 by the knocking cam mechanism section 4, and the pen tip side of the electronic pen main body section 3 projects from the opening portion 2b of the housing 2. When the end portion 42a of the knocking rod 42 is pressed down again from the state illustrated in FIG. 9B, the electronic pen main body section 3 is unlocked by the knocking cam mechanism section 4, and the position of the electronic pen main body section 3 inside the housing 2 is restored to the state illustrated in FIG. 9A by a restoring spring 5.

In the electronic pen 1 described above, the electronic pen main body section 3 has an end portion on the side opposite to the pen tip side fitted into the fitting section 43a of the rotor 43 of the knocking cam mechanism section 4, allowing the electronic pen main body section 3 to be supported at a point. Because the electronic pen main body section 3 slides in and out, the area of the electronic pen 1 between the opening 2b of the housing 2 and the pen tip side of the electronic pen main body section 3 has some leeway on the dimensions. For this reason, when one writes with the electronic pen 1 with the refill body 34 projecting and the electronic pen 1 tilted as illustrated in FIG. 9B, a bending moment is exerted on the electronic pen main body section 3 because of the pen pressure applied to the refill body 34, possibly causing the electronic pen main body section 3 to warp.

As described above, the ferrite core 32 is provided on the pen tip side of the electronic pen main body section 3, and part thereof projects from the opening 2b of the housing 2 of the electronic pen 1. For this reason, there has been a possibility that the ferrite core 32, part of which projects from the opening 2b of the housing 2, may break if the electronic pen main body section 3 warps.

The electronic pen 1 in the example of FIGS. 9A and 9B is an electromagnetic induction electronic pen, and the position detector offers higher position detection accuracy if the coil 31 wound around the ferrite core 32 is brought closer to the side of the pen tip 34a of the refill body 34 so as to reduce the distance to the sensor section of the position detector as much as possible.

However, the electronic pen 1 in the example of FIGS. 9A and 9B is compatible with commercial knocking-type ballpoint pens. Therefore, the coil 31 may not be caused to project externally from the opening 2b of the housing 2 due to the dimensional relationship of the opening 2b of the housing 2 of the electronic pen 1. As a result, it has been difficult to reduce the distance between the coil and the sensor section of the position detector.

Further, there has been a problem in that because the electronic pen main body section 3 of the electronic pen 1 in FIGS. 9A and 9B is supported on the side opposite to the pen tip side, a tolerance of dimensional accuracy is comparatively large.

BRIEF SUMMARY

It is desirable to provide an electronic pen and an electronic pen main body section that can solve the above problems.

In order to solve the above problems, there is provided an electronic pen that includes a housing and an electronic pen main body section. The housing has an opening on at least one side in an axial direction of the housing and a first hollow portion that extends in the axial direction and that is in fluid communication with the opening. The electronic pen main body section is coupled to the housing on a side of the housing that includes the opening.

The electronic pen main body section includes a second hollow portion that extends in the axial direction, a plurality of electronic pen components being accommodated in the second hollow portion, an axial portion that is put into the first hollow portion of the housing via the opening of the housing, and a tip portion that is coupled with the axial portion and externally exposed from the opening of the housing.

A diameter of the tip portion of the electronic pen main body section with the axial portion in the axial direction is larger than a diameter of the opening and a coupling side of the tip portion includes a second ring-shaped end face that comes into contact with a first ring-shaped end face on the side of the housing that includes the opening, and the electronic pen main body section includes a stepped portion on a coupling area between the tip portion and the axial portion.

The electronic pen main body section is coupled to the housing with the second ring-shaped end face of the electronic pen main body section and first ring-shaped end face on the side of the housing that includes the opening in contact.

In the electronic pen having the above configuration, the axial portion of the electronic pen main body section is put into the first hollow portion of the housing from the opening of the housing, and the electronic pen main body section is coupled to the housing with the second ring-shaped end face of the stepped portion on the coupling area between the tip portion and the axial portion and the first ring-shaped end face on the side of the housing that includes the opening in contact. That is, the electronic pen main body section is not coupled to the housing by fastening an end portion of the axial portion, on a side of the housing that is opposite side a pen tip side of the housing, at a point, and instead, is coupled to the housing by causing the first ring-shaped end face of the stepped portion on the coupling area between the tip portion and the axial portion and the second ring-shaped end face of the opening side of the housing to abut each other.

For this reason, in the case where a pressure is applied to the pen tip side of the tip portion of the electronic pen main body section, the pressure is received by the first ring-shaped end face of the housing through the tip portion of the electronic pen main body section. As a result, a bending moment caused by the applied pressure hardly occurs on the electronic pen main body section. Even if a bending moment caused by the applied pressure occurs on the electronic pen main body section, the bending moment is exerted only on the tip portion, and no bending moment is exerted on the axial portion. Therefore, it is possible to avoid warping of the electronic pen main body section as a whole.

According to the electronic pen having the above configuration, the tip portion of the electronic pen main body section projects from the opening of the housing and is sized to have a ring-shaped end face that comes into contact with a ring-shaped end face of the side of the housing that includes the opening, allowing some of the electronic pen components to be accommodated also in an area of the tip portion of the electronic pen main body section. Therefore, for example, in the case where the electronic pen is an electromagnetic induction electronic pen, the coil wound around the magnetic core can be accommodated in an area of the tip portion of the electronic pen main body section, thereby contributing to reduced distance between the coil and the sensor section of the position detector.

The electronic pen main body section is coupled to the housing with the ring-shaped end face of the housing and the ring-shaped end face of the tip portion of the electronic pen main body section in contact, thereby contributing to reduced tolerance of dimensional accuracy.

BRIEF DESCRIPTION OF THE DRAWINGS

FIGS. 1A to 1C are diagrams for describing a configuration example of a first embodiment of an electronic pen according to the present disclosure;

FIGS. 4A and 4B are diagrams for describing a configuration example of a second embodiment of the electronic pen according to the present disclosure;

FIGS. 9A and 9B are diagrams for describing an example of a conventional electronic pen; and FIGS. 10A and 10B are diagrams for describing main components of the electronic pen in the example illustrated in FIGS. 9A and 9B.

DETAILED DESCRIPTION OF THE PREFERRED EMBODIMENTS

First Embodiment

A description will be given of a configuration example of a first embodiment of an electronic pen according to the present disclosure with reference to FIGS. 1A to 1C and FIG. 2. This electronic pen 100 of the first embodiment is an electromagnetic induction electronic pen.

Figure 2:
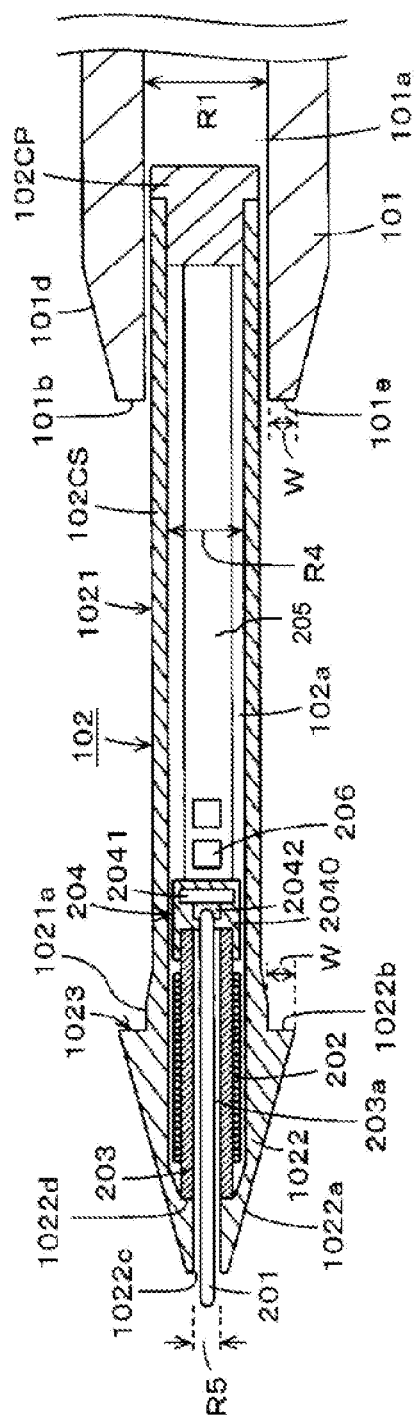
FIG. 2 is a diagram for describing a configuration example of an electronic pen main body section of the first embodiment of the electronic pen according to the present disclosure.

In this electronic pen 100 of the first embodiment, a housing 101 and an electronic pen main body section 102 are coupled together with an axial portion 1021 of the electronic pen main body section 102 which will be described later accommodated in a hollow portion 101a of the housing 101 as illustrated in FIG. 1A. FIG. 1A illustrates a cross-sectional view of only the housing 101. FIG. 1B is an external perspective view of the electronic pen main body section 102. FIG. 1C is a view of the housing 101 as seen from a coupling side with the electronic pen main body section 102 toward an axial direction thereof. Further, FIG. 2 is a diagram depicting the coupling of the electronic pen main body section 102 with the housing 101 in progress and illustrates a cross-sectional view of the housing 101 and the electronic pen main body section 102.

The housing 101 includes, for example, resin, is long and narrow, and in this example, rod-shaped with a hexagonal cross section, and includes, therein, the cylindrical hollow portion 101a that extends in the axial direction along a center line or axis. An inner diameter (diameter) of this cylindrical hollow portion 101a of the housing 101 is R1. In this embodiment, one end portion side of the hollow portion 101a of the housing 101 that extends in the axial direction has an opening 101b (refer to FIG. 1C and FIG. 2). Therefore, the diameter of the opening 101b is R1. The outer shape of the housing 101 is not limited to a hexagonal prism, and the cross section may be in the shape of a polygonal prism or cylindrical.

In this first embodiment, the side of the opening 101b of the housing 101 is a tapered portion 101d that gradually tapers toward the opening 101b. A ring-shaped end face 101e having a given width w, a face that extends in the direction orthogonal to the axial direction, is formed on a tip portion on the side of the opening 101b of the housing 101 as illustrated in FIGS. 1A and 1C and FIG. 2.

The other end portion side of the housing 101 that extends in the axial direction is a closed portion 101c in this example. Of course, the housing 101 may also have an opening provided on the other end portion side in the axial direction such that the opening is closed by a lid portion rather than closing the housing 101 itself with the closed portion 101c.

As illustrated in FIG. 1A, when coupled with the housing 101, the electronic pen main body section 102 includes the axial portion 1021, a portion accommodated in the hollow portion 101a of the housing 101, and a tip portion 1022, a portion coupled to the axial portion 1021 and exposed externally from the opening 101b of the housing 101.

The axial portion 1021 of the electronic pen main body section 102 is, in this embodiment, cylindrical in outer shape having an outer diameter R2 that is slightly smaller than the inner diameter R1 of the cylindrical hollow portion 101a of the housing 101 so as to be accommodated in the hollow portion 101a of the housing 101. However, the outer diameter of a nearby portion 1021a of the coupling area of the axial portion 1021 with the tip portion 1022 is approximately equal to the inner diameter R1 of the hollow portion 101a of the housing 101, and the axial portion 1021 of the electronic pen main body section 102 is press-fitted into the hollow portion 101a of the housing 101 at this nearby portion 1021a, thereby allowing the electronic pen main body section 102 to be locked without falling out of the housing 101.

On the other hand, the tip portion 1022 of the electronic pen main body section 102 is conical in outer shape having a tapered portion 1022a that gradually tapers from the coupling side with the axial portion 1021. In this case, a diameter R3 of a bottom face of the cone, a coupling area of the tip portion 1022 with the axial portion 1021 is set to be larger than that of the opening 101b of the housing 101. In the embodiment, the diameter R3 is selected to be a value that ensures that the tapered portion 101d of the housing 101 and the tapered portion 1022a of the tip portion 1022 are flush and continuous as illustrated in FIG. 1A when the electronic pen main body section 102 is coupled with the housing 101.

That is, the diameter R3 of the bottom face of the cone, a coupling area of the tip portion 1022 with the axial portion 1021, is as follows as illustrated in FIG. 1B:

$R3$=(inner diameter $R1$ of the cylindrical hollow portion 101a of the housing 101)+(twice the width $w$ of the ring-shaped end face 101e of the tip portion on the side of the opening 101b of the housing 101).

Thanks to the above configuration of the electronic pen main body section 102, a stepped portion 1023 is formed on the coupling area between the axial portion 1021 and the tip portion 1022 of the electronic pen main body section 102. The stepped portion 1023 has a ring-shaped end face 1022b of the given width w, a face that extends in the direction orthogonal to the axial direction, as a portion of the bottom face, a coupling side with the axial portion 1021 of the tip portion 1022, that juts out more than the axial portion 1021.

The electronic pen main body section 102 is pushed into the hollow portion 101a of the housing 101 up to the coupling area between the axial portion 1021 and the tip portion 1022 by inserting the axial portion 1021 into the hollow portion 101a from the side of the opening 101b of the housing 101. As a result, the ring-shaped end face 101e of the tip portion on the side of the opening 101b of the housing 101 and the ring-shaped end face 1022b of the tip portion 1022 of the electronic pen main body section 102 come into contact.

At this time, the outer diameter of the nearby portion 1021a of the coupling area of the axial portion 1021 of the electronic pen main body section 102 with the tip portion 1022 is approximately equal to the inner diameter of the hollow portion 101a of the housing 101. As a result, the nearby portion 1021a is press-fitted in the hollow portion 101a of the housing 101. Therefore, the electronic pen main body section 102 is locked in the housing 101 with the ring-shaped end face 101e of the tip portion on the side of the opening 101b of the housing 101 and the ring-shaped end face 1022b of the tip portion 1022 of the electronic pen main body section 102 in contact, thereby allowing the two to be coupled together.

As illustrated in FIG. 1A, the length of the hollow portion 101a of the housing 101 in the axial direction is longer than the axial portion 1021 of the electronic pen main body section 102 in the axial direction. Therefore, a hollow space has been created between the axial end portion of the axial portion 1021 of the electronic pen main body section 102 and the closed portion 101c in the hollow portion 101a of the housing 101.

In this embodiment, a hollow portion 102a that extends in the axial direction is provided in the electronic pen main body section 102 as illustrated in FIG. 2, and a plurality of parts included in electronic pen components are arranged side by side in the axial direction in this hollow portion 102a. In this embodiment, all the electronic pen components for forming an electromagnetic induction electronic pen are accommodated in the hollow portion 102a of the electronic pen main body section 102.

A housing 102CS of the electronic pen main body section 102 in the electronic pen 100 in this embodiment includes, for example, resin. As illustrated in FIG. 2, in this example, the housing of the axial portion 1021 and the housing of the tip portion 1022 as a whole include a single housing 102CS. Of course, the housing of the axial portion 1021 and the housing of the tip portion 1022 may be separate so that the housing 102CS of the electronic pen main body section 102 is formed by coupling the housing of the axial portion 1021 and the housing of the tip portion 1022 together.

In this embodiment, the hollow portion 102a that extends in the axial direction not only is provided within the axial portion 1021 but also extends to the tip portion 1022 in the housing 102CS of the electronic pen main body section 102 as illustrated in FIG. 2. That is, the hollow portion 102a extends in the axial direction to the area on the side of the tip portion 1022 that is located more outward than the opening 101b of the housing 101 when the electronic pen main body section 102 is coupled with the housing 101. In this example, the hollow portion 102a is cylindrical in shape, and a diameter R4 thereof is a value that allows electronic pen components including the plurality of parts described later to be accommodated in the hollow portion 102a.

As illustrated in FIG. 2, the hollow portion 102a is open on the side opposite to the tip portion 1022 of the housing 102CS of the electronic pen main body section 102. The electronic pen components are put into the hollow portion 102a from this opening. The opening on the side opposite to the tip portion 1022 of the hollow portion 102a is closed by a lid portion 102CP.

As described earlier, the hollow portion 102a having the diameter R4 extends to near the tapered end portion of the tip portion 1022 as illustrated in FIG. 2. A through hole 1022c having a small diameter R5 (R5<R4) through which a refill body 201 described later is inserted is provided in the tip portion of the tip portion 1022 as illustrated in FIG. 2 in such a manner as to communicate with the hollow portion 102a. In other words, the through hole 1022c of the tip portion 1022 is in fluid communication with the hollow portion 102a. Therefore, a stepped portion 1022d is formed near the tapered end portion of the tip portion 1022 of the hollow portion 102a.

The electromagnetic induction electronic pen components in this embodiment include the refill body 201, a ferrite core 203 as an example of a magnetic core around which a coil 202 is wound, a pressure detector 204, and a printed circuit board 205 as illustrated in FIG. 2. These electronic pen components are arranged, in the hollow portion 102a of the electronic pen main body section 102, in the order of the ferrite core 203 around which the coil 202 is wound, the pressure detector 204, and the printed circuit board 205 in the axial direction and as viewed from the side of the tip portion 1022.

The end portion of the ferrite core 203 around which the coil 202 is wound on the nearby side of the tapered end portion of the tip portion 1022 is arranged in such a manner as to be in contact with the stepped portion 1022d near the tapered end portion of the tip portion 1022 of the hollow portion 102a as illustrated in FIG. 2. Therefore, not only the ferrite core 203 but also part of the coil 202 wound around the ferrite core 203, and in the example of FIG. 2, the length equal to or more than half the length in the axial direction, are accommodated in the tip portion 1022 of the electronic pen main body section 102.

As illustrated in FIG. 2, the end portion of the ferrite core 203 on the side opposite to the nearby side of the tapered end portion of the tip portion 1022 is fitted into the pressure detector 204. In this example, the pressure detector 204 is accommodated in an area of the axial portion 1021 of the hollow portion 102a.

The pressure detector 204, in this example, has, for example, a cylindrical or prismatic resin package 2040 whose axial direction extends along the center line, and a pressure-sensitive chip 2041 is provided in the package 2040. In this embodiment, the pressure-sensitive chip 2041 includes a variable capacitor that exhibits a capacitance proportional to the pressure applied to the refill body 201. In this example, the pressure-sensitive chip 2041 includes a semiconductor chip having a micro electro mechanical systems (MEMS) element. This pressure-sensitive chip having a MEMS element is disclosed, for example, in Patent Documents such as Japanese Patent Laid-Open No. 2013-161307, and a detailed description thereof is omitted here.

As the pressure detector 204, a member employing a mechanism that changes the capacitor's capacitance in proportion to the pressure applied (pen pressure) (refer, for example, to a Patent Document (Japanese Patent Laid-Open No. 2011-186803)) may be used.

A fitting section is formed on the package 2040 of the pressure detector 204, and the end portion of the ferrite core 203 is fitted into the fitting section. As illustrated in FIG. 2, the side of the pressure-sensitive chip 2041 subject to a pressure in the package 2040 of the pressure detector 204 has a pressure transfer member 2042 that includes an elastic member such as elastic rubber.

The ferrite core 203 has a through hole 203a that extends in the axial direction through which the refill body 201 is inserted, and when the ferrite core 203 around which the coil 202 is wound is put into the hollow portion 102a, the through hole 203a of the ferrite core 203 and the through hole 1022c of the tip portion 1022 communicate. The refill body 201 is inserted through the through hole 1022c of the tip portion 1022 and also through the through hole 203a of the ferrite core 203.

As illustrated in FIG. 2, the pressure transfer member 2042 of the pressure detector 204 has a fitting section formed thereon into which the end portion of the refill body 201 is fitted, and the end portion of the refill body 201 that has been inserted through the through hole 1022c of the tip portion 1022 and the through hole 203a of the ferrite core 203 is fitted thereinto, and the pressure applied to the tip of the refill body 201 is applied to the pressure-sensitive chip 2041 via the pressure transfer member 2042. The refill body 201 can be readily pulled out of the fitting section with the pressure transfer member 2042 for replacement.

A printed circuit board 205 is fitted on the side of the package 2040 of the pressure detector 204 opposite to the tip portion 1022. In this example, the ferrite core 203 around which the coil 202 is wound, the pressure detector 204, and the printed circuit board 205 are arranged side by side in the axial direction and combined into a module. The side of the printed circuit board 205 opposite to the tip portion 1022 is in contact with the lid portion 102CP. That is, in combination with the fact that one end portion of the ferrite core 203 is in contact with the stepped portion 1022d of the tip portion 1022 of the hollow portion 102a, the movement of the modular members including the ferrite core 203 around which the coil 202 is wound, the pressure detector 204, and the printed circuit board 205 in the axial direction is restricted.

That is, the pressure detector 204 is fastened by the lid portion 102CP in such a manner as not to move in the axial direction, and the pressure (pen pressure) applied to the externally projecting portion of the refill body 201 is detected by the pressure-sensitive chip 2041 of the pressure detector 204 as a change in capacitance.

The printed circuit board 205 has a capacitor 206 that is connected in parallel with the coil 202 wound around the ferrite core 203 to form a resonance circuit. Both end portions of the coil 202 and the capacitor 206 are also electrically connected on this printed circuit board 205. A variable capacitor including the pressure-sensitive chip 2041 of the pressure detector 204 is electrically connected in parallel with the coil 202 and the capacitor 206 on the printed circuit board 205.

A description will be given of an example of an electronic circuit of the electronic pen 100 according to this embodiment configured as described above and an example of an electronic circuit of an electromagnetic induction position detector used together with this electronic pen 100 with reference to FIG. 3.

Figure 3:
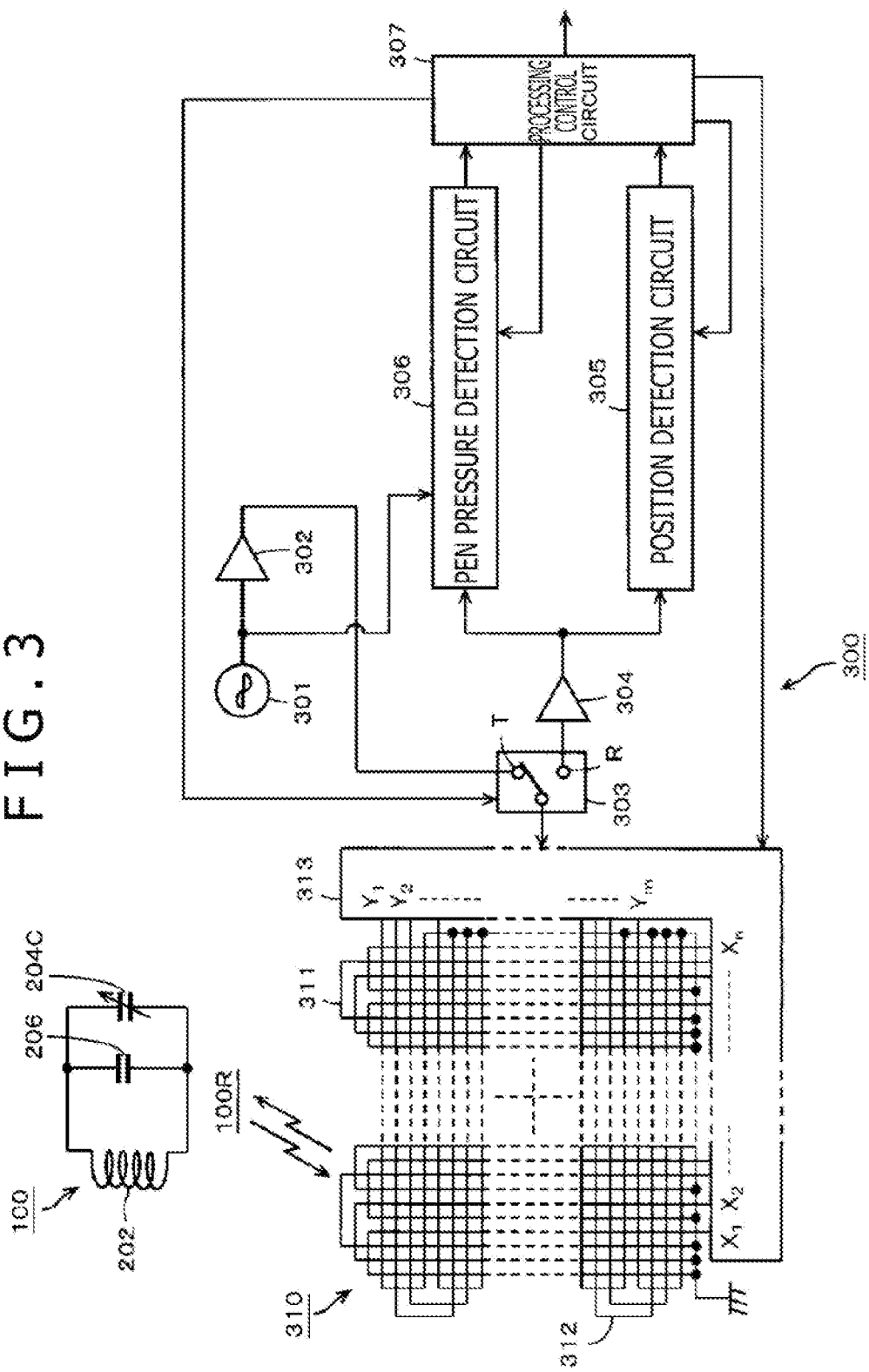
FIG. 3 is a block diagram for describing an example of an electronic circuit of the first embodiment of the electronic pen according to the present disclosure and an example of an electronic circuit of a position detector.

As illustrated in FIG. 3, in the electronic pen 100, one and other end portions of the coil 202 and the capacitor 206 are connected, and a variable capacitor 204C including the pressure-sensitive chip 2041 of the pressure detector 204 is connected in parallel with the coil 202 and the capacitor 206, thereby forming a resonance circuit 100R.

An electromagnetic induction position detector 300 of this embodiment sends a signal to the electronic pen 100 through electromagnetic coupling, and the electronic pen 100 feeds back the signal received from the electromagnetic induction position detector 300 via the resonance circuit 100R.

The electromagnetic induction position detector 300 receives a feedback signal from the resonance circuit 100R of the electronic pen 100 through electromagnetic coupling, detects the position on the sensor pointed to by the electronic pen 100 from the position on the sensor where the received signal is detected, and detects the change in resonance frequency by detecting a phase change of the signal received from the resonance circuit 100R of the electronic pen 100 through electromagnetic coupling, thereby detecting the pen pressure applied to the refill body 201 of the electronic pen 100.

The electromagnetic induction position detector 300 has a sensor 310 formed therein. The sensor 310 includes a position detection coil having an X-axis direction loop coil group 311 and a Y-axis direction loop coil group 312 that are laminated one on top of the other. The electromagnetic induction position detector 300 has a selection circuit 313 to which the X-axis direction loop coil group 311 and the Y-axis direction loop coil group 312 are connected. This selection circuit 313 selects one loop coil after another in one of the two loop coil groups 311 and 312.

The electromagnetic induction position detector 300 has an oscillator 301, a current driver 302, a switching connection circuit 303, a receiving amplifier 304, a position detection circuit 305, a pen pressure detection circuit 306, and a processing control circuit 307. The processing control circuit 307 includes a microcomputer. The processing control circuit 307 controls not only the selection of loop coils by the selection circuit 313 and the switching by the switching connection circuit 303 but also processing timings of the position detection circuit 305 and the pen pressure detection circuit 306.

The oscillator 301 generates an alternating current (AC) signal at a frequency of f0. The oscillator 301 supplies the generated AC signal to the current driver 302 and the pen pressure detection circuit 306. The current driver 302 converts the AC signal, supplied from the oscillator 301, into a current and sends the current to the switching connection circuit 303. The switching connection circuit 303 switches, under control of the processing control circuit 307, between connection destinations (transmitting side terminal T and receiving side terminal R) to which the loop coil selected by the selection circuit 313 is connected. Of these connection destinations, the current driver 302 is connected to the transmitting side terminal T, and the receiving amplifier 304 is connected to the receiving side terminal R.

An induced voltage generated in the loop coil selected by the selection circuit 313 is sent to the receiving amplifier 304 via the selection circuit 313 and the switching connection circuit 303. The receiving amplifier 304 amplifies the induced voltage supplied from the loop coil and sends the amplified voltage to the position detection circuit 305 and the pen pressure detection circuit 306.

An induced voltage is generated in each of the loop coils of the loop coil group 311 and the loop coil group 312 by the radio wave sent from the electronic pen 100. The position detection circuit 305 detects the induced voltage generated in the loop coil, i.e., a reception signal, converts the detection output signal thereof into a digital signal, and outputs the signal to the processing control circuit 307. The processing control circuit 307 calculates coordinate values of the position pointed to by the electronic pen 100 in the X-axis direction and in the Y-axis direction based on the digital signal from the position detection circuit 305, i.e. the voltage value level of the induced voltage generated in each of the loop coils.

On the other hand, the pen pressure detection circuit 306 synchronously detects the output signal of the receiving amplifier 304 with the AC signal from the oscillator 301, acquires a signal whose level is proportional to the phase difference therebetween (frequency shift), converts the signal whose level is proportional to the phase difference therebetween (frequency shift) into a digital signal, and outputs the signal to the processing control circuit 307. The processing control circuit 307 detects the pressure applied to the electronic pen 100 based on the digital signal from the pen pressure detection circuit 306, i.e. the signal level which is proportional to the phase difference (frequency shift) between the sent radio wave and the received radio wave.

[Effect of Electronic Pen 100 of First Embodiment]

In the electronic pen 100 of the first embodiment described above, the axial portion 1021 of the electronic pen main body section 102 is put into the hollow portion 101a of the housing 101 from the opening 101b on the one side of the housing 101 in the axial direction and is coupled with the housing 101 at the stepped portion 1023 of the coupling area between the tip portion 1022 and the axial portion 1021, with the ring-shaped end face 1022b of the tip portion 1022 and the ring-shaped end face 101e on the side of the opening 101b of the housing 101 in contact. That is, the electronic pen main body section 102 is not coupled with the housing by fastening the end portion of the axial portion, the opposite side of the pen tip side, at a point, and instead, is coupled with the housing by causing the ring-shaped end face 1022b of the stepped portion 1023 on the coupling area between the tip portion 1022 and the axial portion 1021 and the ring-shaped end face 101e of the side of the opening 101b of the housing 101 to abut each other.

For this reason, in the case where a force is exerted on the tip portion 1022 of the electronic pen main body section 102, the force and a bending moment are received by the ring-shaped end face 101e of the housing 101 through the tip portion 1022 of the electronic pen main body section 102. Therefore, the bending moment is not applied to the axial portion 1021 of the electronic pen main body section 102. As a result, the electronic pen main body section 102 hardly warps unlike a conventional case in which the electronic pen main body section is supported by the end portion of the axial portion 1021 on the opposite side of the pen tip side.

In the case where a pressure (pen pressure) in the direction intersecting the axial direction is applied to the refill body 201 that has been attached through the through hole 1022c of the tip portion 1022, the refill body 201 comes into contact with the opening of the through hole 1022c of the tip portion 1022, causing the force (bending moment) applied to the refill body 201 to be exerted on the tip portion 1022. However, a bending moment caused by the applied pen pressure hardly occurs on the electronic pen main body section 102 as described above, making it possible to avoid warping of the electronic pen main body section 102. Therefore, it is possible to avoid damage to the ferrite core 203 accommodated in the electronic pen main body section 102.

In the electronic pen main body section 102 of the electronic pen 100 of the first embodiment, the hollow portion 102a thereof is provided in the axial portion 1021 and additionally extends to near the tapered end portion of the tip portion 1022, and the area of the ferrite core 203 around which the coil 202 is wound is provided in the area of the tip portion 1022 of the hollow portion 102a. This makes it possible to arrange the coil 202 wound around the ferrite core 203 close to the tip of the refill body 201 of the electronic pen 100. For this reason, the distance between the coil 202 and the sensor section of the position detector can be reduced, contributing to stronger electromagnetic coupling between the electronic pen and the sensor of the position detector.

The coupling between the electronic pen main body section 102 and the housing 101 is achieved by the ring-shaped end face 101e on the pen tip side of the housing 101 coming into contact with the ring-shaped end face 1022b of the tip portion 1022 of the electronic pen main body section 102. Therefore, there is no need to support the axial portion 1021 of the electronic pen main body section 102 in the hollow portion 101a of the housing 101, and the end portion of the axial portion 1021 on the opposite side of the pen tip side is a free end in the hollow portion 101a. For this reason, the hollow portion 101a of the housing 101 may be a simple columnar space. Because there is no need to work on an inner wall surface of the hollow portion 101a, the housing 101 becomes significantly simpler in structure.

In this embodiment, the outer diameter of the nearby portion 1021a of the coupling area of the axial portion 1021 of the electronic pen main body section 102 with the tip portion 1022 is approximately equal to the diameter of the hollow portion 101a of the housing 101. The nearby portion 1021a of the coupling area of the axial portion 1021 of the electronic pen main body section 102 with the tip portion 1022 is press-fitted into the hollow portion 101a of the housing 101. The electronic pen main body section 102 is locked in the housing 101 with the ring-shaped end face 1022b in contact with the ring-shaped end face 101e. Therefore, the electronic pen 100 of this embodiment permits coupling with the housing 101 simply by inserting the axial portion 1021 of the electronic pen main body section 102 into the hollow portion 101a of the housing 101.

In this embodiment, uncoupling can be readily achieved by pulling the electronic pen main body section 102 out of the housing 101 in the axial direction. Therefore, the electronic pen main body section 102 coupled with the housing 101 can be readily replaced.

In the electronic pen 100 of the above embodiment, a peripheral portion of the end portion on the side of the opening 101b of the housing 101 is the tapered portion 101d, and the tapered portion 101d and the tapered portion 1022a of the tip portion 1022 of the electronic pen main body section 102 are linearly continuous. This allows a user to use the electronic pen 102 at a more inclined angle.

Second Embodiment

In the electronic pen 100 of the first embodiment described above, the opening 101b is provided on the one side of the housing 101 in the axial direction. The electronic pen main body section 102 is coupled with the housing 101 by inserting the axial portion 1021 of the electronic pen main body section 102 from this opening 101b, and the other end of the housing 101 in the axial direction is closed. However, it is possible to provide an opening on the other end of the housing 101 in the axial direction and couple another electronic pen main body section having a similar configuration to the electronic pen main body section of the above embodiment with this opening on the other side in the axial direction.

A second embodiment is a case of an electronic pen that permits an electronic pen main body section to be coupled not only on one side of the housing in the axial direction but also on another side of the housing in the axial direction.

FIGS. 4A and 4B are diagrams for describing a configuration example of an electronic pen 100B of this second embodiment. In this second embodiment, the same portions as those in the first embodiment are denoted by the same reference numerals. FIG. 4A is a diagram for describing the overall configuration of the electronic pen 100B of this second embodiment and illustrates a cross section of only a housing 101B. The housing 101B of the electronic pen 100B of this second embodiment differs from the housing 101 of the first embodiment only in that the housing 101B has a tubular shape and also has an opening 101f on the other side in the axial direction, and the housing 101B is configured similarly to the housing 101 of the first embodiment in all other respects.

In the electronic pen 100B of this second embodiment, the electronic pen main body section 102 is coupled on the side of the one opening 101b of the housing 101B in the axial direction similarly to the first embodiment, and another electronic pen main body section 103 is coupled on the side of the other opening 101f of the housing 101B in the axial direction. In this second embodiment, this electronic pen main body section 103 has a function to delete information regarding a pointing position input by pointing, with the electronic pen 100B, on the position detector that is used together with the electronic pen 100B of the second embodiment. For this reason, in the description given below, the other electronic pen main body section 103 will be referred to as the electronic eraser function section 103.

The configuration of the electronic eraser function section 103 will be described below with reference to FIGS. 4A and 4B. FIG. 4B is a diagram depicting the coupling of the electronic eraser function section 103 with the housing 101B in progress and illustrates a cross-sectional view of the housing 101B and the electronic eraser function section 103.

The electronic eraser function section 103 includes an axial portion 1031 and a tip portion 1032 as illustrated in FIGS. 4A and 4B. The axial portion 1031 is accommodated in the hollow portion 101a of the housing 101B when coupled on the side of the opening 101f of the housing 101B. The tip portion 1032 is coupled together with the axial portion 1031 and externally exposed from the opening 101f of the housing 101B.

The axial portion 1031 of the electronic eraser function section 103 is similar in outer shape to the axial portion 1021 of the electronic pen main body section 102 of the first embodiment. The axial portion 1031 is cylindrical having the outer diameter R2 that is slightly smaller than the inner diameter R1 of the hollow portion 101a so as to be accommodated in the hollow portion 101a of the housing 101B.

The outer diameter of a nearby portion 1031a of the coupling area of the axial portion 1031 of the electronic eraser function section 103 with the tip portion 1032 is approximately equal to the inner diameter R1 of the hollow portion 101a of the housing 101B, and the axial portion 1031 of the electronic eraser function section 103 is press-fitted into the hollow portion 101a of the housing 101B at this nearby portion 1031a, thereby allowing the electronic eraser function section 103 to be locked without falling out of the housing 101B.

In this example, the tip portion 1032 of the electronic eraser function section 103 is cylindrical in outer shape having an outer diameter equal to an outer diameter R6 of the housing 101B. Therefore, a stepped portion 1033 is formed on the coupling area between the axial portion 1031 and the tip portion 1032 of the electronic eraser function section 103, and a ring-shaped end face 1032b having a given width wB is provided. In this case, the given width wB is equal to a thickness of the tubular housing 101B.

The electronic eraser function section 103 is coupled with the housing 101B by inserting the axial portion 1031 from the side of the opening 101f of the housing 101B and pushing the axial portion 1031 into the hollow portion 101a of the housing 101 to the coupling area between the axial portion 1031 and the tip portion 1032. In this coupling state, a ring-shaped end face 101g of the tip portion on the side of the opening 101f of the housing 101B and the ring-shaped end face 1032b of the tip portion 1032 of the electronic eraser function section 103 come into contact.

With the ring-shaped end face 101g of the tip portion on the side of the opening 101f of the housing 101B and the ring-shaped end face 1032b of the tip portion 1032 of the electronic eraser function section 103 in contact, the electronic eraser function section 103 is locked in the housing 101B, thereby allowing the two to be coupled together.

In the electronic pen 100B of the second embodiment, the length of the hollow portion 101a of the housing 101B in the axial direction is selected to be longer than the sum of the length of the electronic pen main body section 102 and the length of the axial portion 1031 of the electronic eraser function section 103 as illustrated in FIG. 4A. In the hollow portion 101a of the housing 101B, therefore, a hollow space is created in the hollow portion 101a of the housing 101B between the axial end portion of the axial portion 1021 and the axial end portion of the axial portion 1031.

The electronic eraser function section 103 of the electronic pen 100B of this second embodiment has a hollow portion 103a that extends in the axial direction as illustrated in FIG. 4B. In this example, a plurality of parts included in electronic eraser rubber components are arranged side by side in the axial direction in this hollow portion 103a as examples of electronic pen components. In the second embodiment, all the electronic eraser rubber components for deleting coordinate information input by pointing with the electromagnetic induction electronic pen main body section 102 are accommodated in the hollow portion 103a of the electronic eraser function section 103.

In the electronic pen 100B of this second embodiment, a housing 103CS of the electronic eraser function section 103 includes, for example, resin and has a similar configuration to the housing 102CS of the electronic pen main body section 102. That is, the single housing 103CS includes the housing of the axial portion 1031 and the housing of the tip portion 1032 as a whole as illustrated in FIG. 4B. Of course, the housing of the axial portion 1031 and the housing of the tip portion 1032 may be separate so that the housing 103CS of the electronic eraser function section 103 is formed by coupling the housing of the axial portion 1031 and the housing of the tip portion 1032 together.

In this embodiment, the hollow portion 103a that extends in the axial direction extends from the axial portion 1031 to the tip portion 1032 in the housing 103CS of the electronic eraser function section 103 as illustrated in FIG. 4B. In this example, the hollow portion 103a is cylindrical and has a diameter R7 that permits accommodation, in the hollow portion 103a, of a ferrite core 213 around which a coil 212 described later is wound, a pressure detector 214, and a printed circuit board 215 that are included in the electronic eraser rubber components.

As illustrated in FIG. 4B, the hollow portion 103a is open on the side opposite to the tip portion 1032 of the housing 103CS of the electronic eraser function section 103. The electronic eraser rubber components are put into the hollow portion 103a from this opening. The opening of the hollow portion 103a on the side opposite to the tip portion 1032 is closed by a lid portion 103CP.

As described earlier, the hollow portion 103a having the diameter R7 extends to near the axial end portion of the tip portion 1032 as illustrated in FIG. 4B. A through hole 1032c having a small diameter R8 (R8<R7) through which a pressure transfer rod-shaped body 211a of a deletion pointing section 211 described later is inserted is provided in the axial end portion of the tip portion 1032 as illustrated in FIG. 4B in such a manner as to communicate with the hollow portion 103a.

In this embodiment, the electronic eraser rubber components include the deletion pointing section 211, the ferrite core 213 around which the coil 212 is wound, the pressure detector 214, and the printed circuit board 215 as illustrated in FIG. 4B. These electronic eraser rubber components are arranged, in the hollow portion 103a of the electronic eraser function section 103, in the order of the ferrite core 213 around which the coil 212 is wound, the pressure detector 214, and the printed circuit board 215 in the axial direction and as viewed from the side of the tip portion 1032.

In this example, the deletion pointing section 211 includes resin, is disk-shaped, and has a rod-shaped body 211a at the center of the disk-shaped portion. The rod-shaped body 211a is provided to run in the axial direction to transfer the pressure applied to the deletion pointing section 211 to the pressure detector 214.

The ferrite core 213 has a through hole 213a that extends in the axial direction through which the rod-shaped body 211a of the deletion pointing section 211 is inserted, and the through hole 213a of the ferrite core 213 and the through hole 1032c of the tip portion 1032 communicate. The rod-shaped body 211a of the deletion pointing section 211 is inserted through the through hole 1032c and also through the through hole 213a.

Not only the ferrite core 213 but also part of the coil 212 wound, and in the example of FIG. 4B, the length equal to or more than half the length in the axial direction, are accommodated in the tip portion 1032 of the electronic eraser function section 103. That is, not only the ferrite core 213 but also the coil 212 are provided in proximity to the axial end portion of the tip portion 1032 of the electronic eraser function section 103.

As illustrated in FIG. 4B, the end portion of the ferrite core 213 on the side opposite to the nearby side of the axial end portion of the tip portion 1032 is fitted into the pressure detector 214.

In this example, the pressure detector 214 has a similar configuration to the pressure detector 204 of the electronic pen main body section 102 described earlier. The pressure detector 214 has, for example, a cylindrical or prismatic resin package 2140 whose axial direction extends along the center line, and a pressure-sensitive chip 2141 is provided in the package 2140. The pressure-sensitive chip 2141 includes a semiconductor chip that includes a MEMS element included in a variable capacitor that exhibits a capacitance proportional to the pressure applied as does the pressure-sensitive chip 2041 of the pressure detector 204 in the first embodiment described earlier.

As the pressure detector 214, a member employing a mechanism that changes the capacitor's capacitance in proportion to the pen pressure (refer, for example, to a Patent Document (Japanese Patent Laid-Open No. 2011-186803)) may be used.

A fitting section is formed on the package 2140 of the pressure detector 214, and the end portion of the ferrite core 213 is fitted into the fitting section.

A fitting section into which the end portion of the pressure transfer rod-shaped body 211a of the deletion pointing section 211 is fitted is formed on a pressure transfer member 2142 of the pressure detector 214 as illustrated in FIG. 4B. The pressure applied to the deletion pointing section 211 is exerted on the pressure-sensitive chip 2141 via the pressure transfer member 2142. The deletion pointing section 211 can be readily pulled out.

The printed circuit board 215 is fitted on the side of the package 2140 of the pressure detector 214 opposite to the side of the tip portion 1032. In this case, therefore, the ferrite core 213 around which the coil 212 is wound, the pressure detector 214, and the printed circuit board 215 are arranged side by side in the axial direction and combined into a module. The side of the printed circuit board 215 opposite to the tip portion 1032 is in contact with the lid portion 103CP. In combination with the fact that one end portion of the ferrite core 213 is in contact with the stepped portion 1032d of the tip portion 1032 of the hollow portion 103a, the movement of the modular members including the ferrite core 213 around which the coil 212 is wound, the pressure detector 214, and the printed circuit board 215 in the axial direction is restricted by the lid portion 103CP.

Therefore, the pressure detector 214 is restricted in position by the lid portion 103CP in such a manner as not to move in the axial direction, making it possible to detect the pressure applied to the deletion pointing section 211 using the pressure-sensitive chip 2141 of the pressure detector 214.

The printed circuit board 215 has a capacitor 216 that is connected in parallel with the coil 212 wound around the ferrite core 213 to form a resonance circuit 103R (not illustrated).

In the electronic eraser function section 103 of this second embodiment, the resonance frequency of the resonance circuit 103R that includes the coil 212, the capacitor 216, and a variable capacitor that includes the pressure-sensitive chip 2141 of the pressure detector 214 differs from the resonance frequency of the resonance circuit 102R of the electronic pen main body section 102 on the side of the position detector to a distinguishable extent.

The position detector used together with the electronic pen 100B of this second embodiment detects position coordinates on the sensor pointed to by the refill body 201 of the electronic pen main body section 102 through electromagnetic coupling with the resonance circuit 102R of the electronic pen main body section 102 and deletes, in the sensor area pointed to by the deletion pointing section 211, position coordinates previously input by pointing through electromagnetic coupling with the resonance circuit 103R of the electronic eraser function section 103.

In this case, for example, the position detector sends a first AC signal at the resonance frequency of the resonance circuit 102R and a second AC signal at the resonance frequency of the resonance circuit 103R in a time-shared manner, performs a process of detecting the position pointed to by the electronic pen main body section 102 during a transmission period of the first AC signal, and performs a process of deleting the area pointed to by the electronic eraser function section 103 during a transmission period of the second AC signal.

The electronic pen 100B of this second embodiment can be readily realized by coupling both the electronic pen main body section 102 for inputting a pointing position and the electronic eraser function section 103 on the one and other opening sides of the tubular housing 101B in the axial direction. In the electronic pen 100B of this second embodiment, the coupling of the electronic eraser function section 103 is achieved with the ring-shaped end face 1032b of the stepped portion on the coupling area between the tip portion 1032 and the axial portion 1031 in contact with the ring-shaped end face 101g of the housing 101B. This is effective because the deletion pointing section 211 has a yield strength to withstand a large pressure that could be applied to the deletion pointing section 211.

[Other Embodiment of Electronic Pen Main Body Section]

<Other Example of Electromagnetic Induction Electronic Pen Main Body Section>

Although the pressure detector 204 and the pressure detector 214 in the electronic pen main body section 102 of the embodiment described above and the electronic eraser function section 103, another example of the electronic pen main body section, included a variable capacitor whose capacitance changes in proportion to the applied pressure, the pressure detector is not limited to the one using a variable capacitor.

Figure 5:
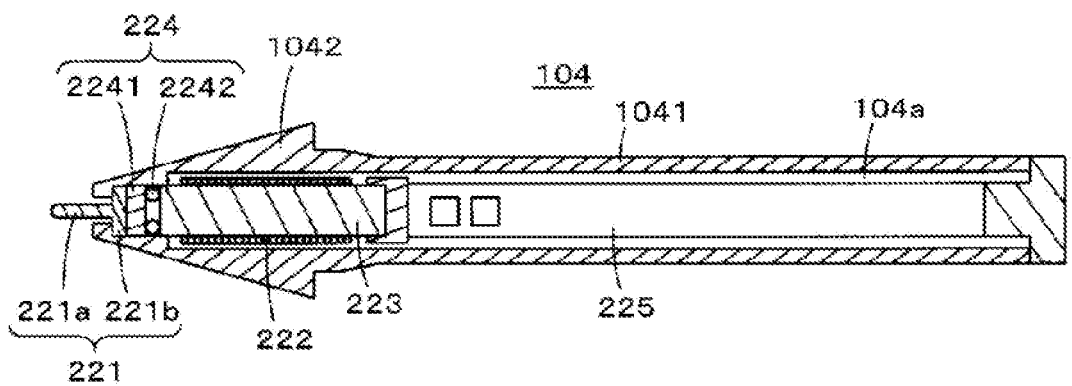
FIG. 5 is a diagram for describing another configuration example of the electronic pen main body section of the electronic pen according to the present disclosure.

FIG. 5 illustrates an example of an electronic pen main body section 104 using a pressure detector whose inductance changes in proportion to the applied pressure and that changes the resonance frequency of the resonance circuit in proportion to the pressure. FIG. 5 is a vertical cross-sectional view of the electronic pen main body section 104.

That is, the electronic pen main body section 104 in the example illustrated in FIG. 5 includes, in terms of appearance, an axial portion 1041 and a tip portion 1042 having similar configurations to the axial portion 1021 and the tip portion 1022 of the electronic pen main body section 102 of the embodiment described above. The electronic pen components accommodated in a hollow portion 104a of the electronic pen main body section 104 in this example are different from those of the electronic pen main body section 102.

The electronic pen components of the electronic pen main body section 104 in this example include a refill body 221, a ferrite core 223 around which a coil 222 is wound, a pressure detector 224, and a printed circuit board 225. In this example, the pressure detector 224 is provided between the refill body 221 and the ferrite core 223 around which the coil 222 is wound in the tip portion 1042 of the hollow portion 104a.

The refill body 221 is shaped such that a refill body rod-shaped portion 221a is provided at the center of a disk-shaped flange portion 221b as illustrated in FIG. 5. No through hole is provided in the ferrite core 223 around which the coil 222 is wound.

The pressure detector 224 in this example includes a disk-shaped ferrite chip 2241 and an O-ring 2242 that includes an elastic member.

In this electronic pen main body section 104, when a pressure is applied to the refill body 221, the O-ring 2242 that includes an elastic member deformed elastically in the axial direction in proportion to the pressure, thereby changing the distance between the ferrite chip 2241 and the ferrite core 223. This changes the inductance of the resonance circuit that includes the coil 222 and a capacitor 226, thereby changing the resonance frequency. The position detector can detect the pressure (pen pressure) applied to the refill body 221 of the electronic pen main body section 104 by detecting this change in resonance frequency in a manner similar to the description given earlier.

The electronic pen main body section 104 of this example has an advantageous effect similar to the electronic pen main body section 102 described above and additionally has an advantageous effect in that the ferrite core 223 is easy to form and robust because there is no need to provide a through hole in the ferrite core 223 around which the coil 222 is wound.

Figure 6:
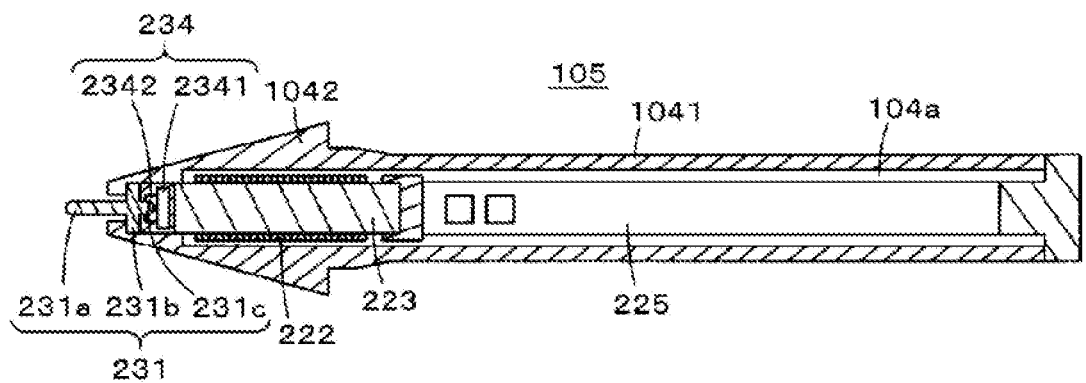
FIG. 6 is a diagram for describing another configuration example of the electronic pen main body section of the electronic pen according to the present disclosure.

FIG. 6 is a modification example of the electronic pen main body section 104 illustrated in FIG. 5, and the same portions as those in FIG. 5 are denoted by the same reference numerals. An electronic pen main body section 105 in this example differs from the electronic pen main body section 104 in that the pressure detector included in the electronic pen components is different. The configuration of the electronic pen components accommodated in the hollow portion 104a is different from that of the electronic pen main body section 104.

A pressure detector 234 is provided between a refill body 231 and a ferrite core 233 around which a coil 232 is wound in the tip portion 1042 of the hollow portion 104a.

In this example, the pressure detector 234 includes a member using a pressure-sensitive chip 2341 that includes a MEMS element included in a variable capacitor as does the pressure detector 214 of the electronic pen main body section 102 described earlier. The refill body 231 includes a disk-shaped flange portion 231b and a refill body rod-shaped portion 231a as does the refill body 221. The flange portion 231b includes a pressure transfer rod-shaped body 231c that projects on the opposite side of the refill body rod-shaped portion 231a and is fitted into a fitting section provided on a pressure transfer member 2342 of the pressure detector 234. When a pressure is applied to the refill body 231, the pressure is transferred to the pressure-sensitive chip 2341 of the pressure detector 234 by the pressure transfer rod-shaped body 231c of the refill body 231 via the pressure transfer member 2342, changing the capacitance of the pressure-sensitive chip 2341 in proportion to the applied pressure.

The electronic pen main body section 105 in the example illustrated in FIG. 6 has a similar advantageous effect to the electronic pen main body section 104 in the example illustrated in FIG. 5.

<Example of Active Capacitive Electronic Pen Main Body Section>

It is needless to say that although the embodiment described above is a case of an electromagnetic induction electronic pen, the present disclosure is also applicable to capacitive electronic pens.

Figure 7:
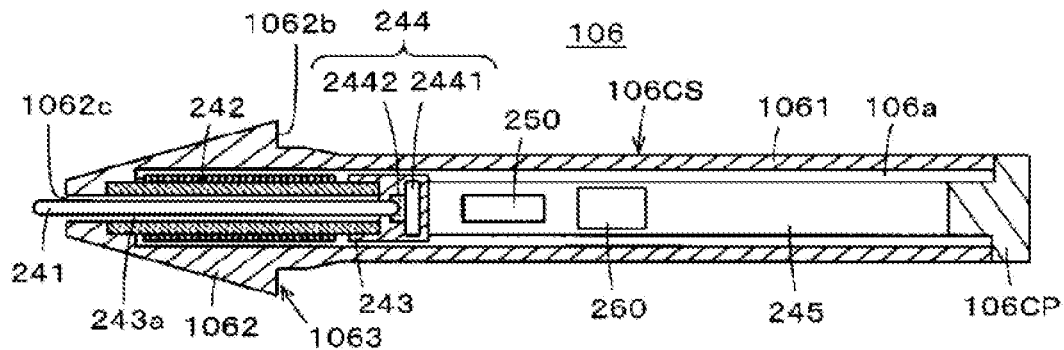
FIG. 7 is a diagram for describing another configuration example of the electronic pen main body section of the electronic pen according to the present disclosure.

FIG. 7 is a diagram illustrating a configuration example of an electronic pen main body section in the case where the present disclosure is applied to an active capacitive electronic pen. An active capacitive electronic pen main body section 106 in this example illustrated in FIG. 7 has, in terms of appearance, a similar configuration to the electronic pen main body section 102 of the embodiment described earlier, and an axial portion 1061 and a tip portion 1062 are included in a single housing 106CS.

The axial portion 1061 and the tip portion 1062 of the electronic pen main body section 106 have similar configurations respectively to the axial portion 1021 and the tip portion 1022 of the electronic pen main body section 102 of the embodiment described earlier. A stepped portion 1063 is formed on the coupling area between the tip portion 1062 and the axial portion 1061, and a ring-shaped end face 1062b is provided on the side of the coupling area between the tip portion 1062 and the axial portion 1061. The ring-shaped end face 1062b is in contact with the ring-shaped end face of the opening of the electronic pen housing.

In this electronic pen main body section 106, electronic pen components having approximately similar configurations to those of the electronic pen main body section 102 of the embodiment described above except for the respects described below are accommodated in a hollow portion 106a that stretches across the axial portion 1061 and the tip portion 1062.

A ferrite core 243 has a through hole 243a penetrated by a refill body 241. The refill body 241 is inserted through a through hole 1062c of the tip portion 1062 and a through hole 243a of the ferrite core 243, and the end portion thereof is fitted into a pressure transfer member 2442 of a pressure detector 244. In this example of the electronic pen main body section 106, however, the refill body 241 includes resin or other material that is conductive, for example, as a result of mixture of a conductive metal or conductive powder.

In the pressure detector 244, although not illustrated, a terminal electrically connected to the refill body 241 that is fitted into the pressure transfer member 2442 is drawn out separately from the terminal drawn out of a pressure-sensitive chip 2441.

A signal transmission circuit 260 and a supply voltage generation circuit 250 are provided on a printed circuit board 245 of the electronic pen main body section 106 in this example. The supply voltage generation circuit 250 charges using a coil 242 as a charging coil and stores power. In this example, the refill body 241 is electrically connected to the signal transmission circuit 260 using the terminal drawn out of the pressure detector 244 so that a signal from the signal transmission circuit 260 is supplied to the conductive refill body 241.

The terminal drawn out of the pressure-sensitive chip 2441 of the pressure detector 244 is electrically connected to the signal transmission circuit 260, and an oscillation frequency of an oscillation circuit included in the signal transmission circuit 260 changes in proportion to a variable capacitor 244C that includes the pressure detector 244. The electronic pen main body section 106 is similar to the electronic pen main body section 102 in other configuration.

Figure 8:
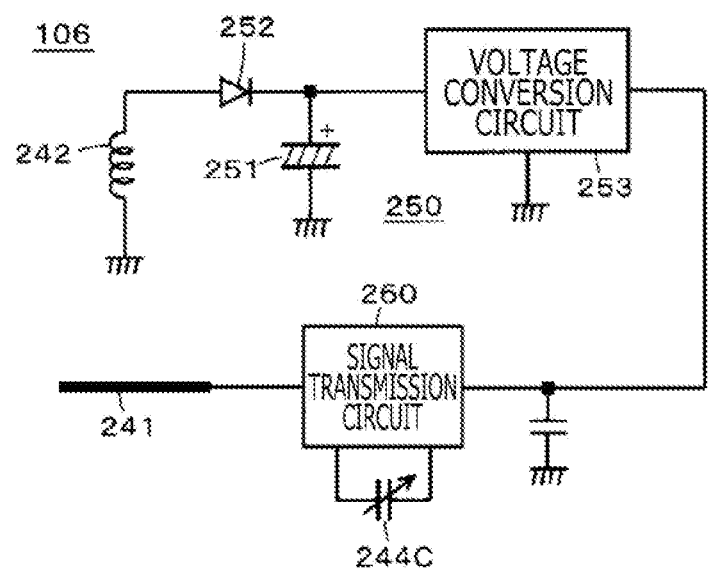
FIG. 8 is a circuit diagram for describing an example of an electronic circuit of the electronic pen main body section in the example illustrated in FIG. 7.

FIG. 8 illustrates an example of a circuit configuration of the printed circuit board 245 of the active capacitive electronic pen main body section 106 in this example.

In this example, electronic circuits formed on the printed circuit board 245 are the signal transmission circuit 260 and the supply voltage generation circuit 250 that drives the signal transmission circuit 260 as illustrated in FIG. 8. The supply voltage generation circuit 250 has a circuit configuration including an electric double layer capacitor 251 as an example of a power storage element that generates a drive voltage (supply voltage), a rectifying diode 252, and a voltage conversion circuit 253. The signal transmission circuit 260 includes an oscillation circuit in this example.

The refill body 241 is electrically connected to the signal transmission circuit 260 of the printed circuit board as described earlier. The variable capacitor 244C that includes the pressure detector 244 is electrically connected to the signal transmission circuit 260. The oscillation circuit included in the signal transmission circuit 260 generates a signal whose frequency changes in proportion to the capacitance of the variable capacitor 244C that includes the pressure detector 244, supplying the generated signal to the refill body 241.

When attached to a charger that is not illustrated, the electronic pen to which the electronic pen main body section 106 in this example is attached generates an induced electromotive force in the coil 242 thanks to an alternating magnetic field generated by the charger, thereby charging the electric double layer capacitor 251 via the diode 252. The voltage conversion circuit 253 converts the voltage stored in the electric double layer capacitor 251 into a voltage having a constant level, supplying the voltage as a power source of the signal transmission circuit 260.

When the electronic pen to which the active capacitive electronic pen main body section 106 is attached operates normally (when the electronic pen does not perform charging operation), the coil 242 is at a fixed potential (ground potential (GND) in this case) and, therefore, acts as a shield electrode provided around the refill body 241. The fixed potential of the coil 242 during normal operation of the electronic pen to which the electronic pen main body section 106 is attached is not limited to ground potential and may be the positive potential of the power supply or the intermediate potential between the positive potential of the power supply and ground potential.

The signal transmission circuit (oscillation circuit) 260 generates a signal whose frequency changes in proportion to the capacitance of the variable capacitor 244C that includes the pressure-sensitive chip 2441 of the pressure detector 244, supplying the generated signal to the refill body 241. The signal from the signal transmission circuit 260 is radiated as an electric field based on the signal from the refill body 241. The oscillation circuit included in the signal transmission circuit 260 includes, for example, an LC circuit using resonance that occurs with a coil and a capacitor. The position detector that detects the coordinates of the position pointed to by the electronic pen to which the electronic pen main body section 106 in this embodiment is attached can find the pressure (pen pressure) applied to the refill body 241 from the frequency of this signal.

Other Embodiment or Modification Example

It has been described that the electronic pen main body sections 104 to 106 illustrated in FIGS. 5 to 7 are used to point to positions. As a modification example thereof, however, the electronic pen main body section can be configured as an electronic eraser function section by using a tip portion and a refill body having similar configurations to those of the second embodiment.

In the second embodiment, an electronic pen main body section for pointing to a position was coupled on the one opening side of the tubular housing in the axial direction, and an electronic pen main body section configured as an electronic eraser function section that deletes the coordinates of the previously input pointing position was coupled on the other opening side. However, electronic pen main body sections for pointing to positions may be coupled on the one and other opening sides of the housing in the axial direction. In this case, the electronic pen main body sections that are coupled may have the same or different configurations. For example, an electromagnetic induction electronic pen main body section may be coupled on the one opening side of the housing in the axial direction, and an active capacitive electronic pen main body section may be coupled on the other opening side.

Although the preferred embodiments have been described in detail above, it should be understood that various changes and modifications may be made therein without departing from the scope of the appended claims.

What is claimed is:
1. An electronic pen comprising:
a housing having a side in an axial direction of the housing that includes an opening, and a first hollow portion that extends in the axial direction and that is in fluid communication with the opening; and
an electronic pen main body section that is coupled to the housing on the side of the housing that includes the opening, wherein:
the electronic pen main body section includes:
a second hollow portion that extends in the axial direction, a plurality of electronic pen components being accommodated in the second hollow portion;

an axial portion that is put into the first hollow portion of the housing via the opening of the housing; and a tip portion that is coupled to the axial portion and externally exposed from the opening of the housing, a diameter of the tip portion of the electronic pen main body section is larger than a diameter of the opening, a coupling side of the tip portion includes a second ring-shaped end face that comes into contact with a first ring-shaped end face on the side of the housing that includes the opening, and the electronic pen main body section includes a stepped portion on a coupling area between the tip portion and the axial portion, and the electronic pen main body section is coupled to the housing with the second ring-shaped end face of the electronic pen main body section and the first ring-shaped end face on the side of the housing that includes the opening in contact with each other.

2. The electronic pen of claim 1, wherein
the second hollow portion of the electronic pen main body section extends from the tip portion to the axial portion, and the electronic pen components are accommodated in the second hollow portion and span across the axial portion and the tip portion of the electronic pen main body section.

3. The electronic pen of claim 2, wherein
the electronic pen components include a coil wound around a magnetic core, and part of the magnetic core and the coil is accommodated in an area of the tip portion of the second hollow portion.

4. The electronic pen of claim 1, wherein
the electronic pen components include a plurality of members arranged in the axial direction in the second hollow portion, and
a circuit board is accommodated in the second hollow portion of the electronic pen main body section, and at least some of the electronic pen components are provided on the circuit board, and the at least some of the electronic pen components and the electronic pen components other than the at least some of the electronic pen components are electrically connected on the circuit board.

5. The electronic pen of claim 1, wherein
the tip portion is tapered such that the farther the tip portion is away from the coupling side with the axial portion in the axial direction, the smaller the tip portion is than the coupling side with the axial portion.

6. The electronic pen of claim 1, wherein
the electronic pen components include a pressure detector configured to detect a pressure applied to a side of the tip portion, and a refill body configured to transfer the pressure to the pressure detector in the second hollow portion, and
the tip portion includes a refill body opening portion that is in fluid communication with the second hollow portion, and the refill body is mounted in such a manner as to transfer the pressure to the pressure detector with one end of the refill body projecting from the refill body opening portion.

7. The electronic pen of claim 6, wherein
the side of the axial portion of the electronic pen main body section opposite to the coupling side with the tip portion is a closed portion that closes the second hollow portion, and the position of the pressure detector in the axial direction is restricted by the closed portion.

8. The electronic pen of claim 1, wherein
the electronic pen main body section is locked in the housing as a result of fitting of a portion of the coupling area of the axial portion of the electronic pen main body section with the tip portion into a portion of an opening of the first hollow portion of the housing.

9. The electronic pen of claim 1, wherein
at least one of the electronic pen components, in operation, couples with a position detector through electromagnetic induction.

10. The electronic pen of claim 1, wherein
at least one of the electronic pen components, in operation, capacitively sends a signal to a position detector.

11. The electronic pen of claim 1, wherein
at least some of the electronic pen components, in operation, provide a signal to a position detector that performs a function, based on the signal, that deletes a coordinate position input by pointing.

12. An electronic pen comprising:
a housing having a first hollow portion that extends in an axial direction of the housing and that is in fluid communication with a first opening on a first side in the axial direction, and a second hollow portion that extends in the axial direction and that is in fluid communication with a second opening on second side in the axial direction;
a first electronic pen main body section that is coupled to the housing on the first side the housing, the first electronic pen main body section including a third hollow portion in which a plurality of first electronic pen component members are accommodated; and
a second electronic pen main body section that is coupled to the housing on the second side of the housing, the second electronic pen main body section including a fourth hollow portion in which a plurality of second electronic pen components are accommodated, wherein:
the first electronic pen main body section further includes:
a first axial portion that is put into the first hollow portion of the housing via the first opening of the housing; and
a first tip portion that is coupled to the first axial portion and externally exposed from the first opening of the housing,
a diameter of the first tip portion of the first electronic pen main body section is larger than a diameter of the first opening, a coupling side of the first tip portion includes a second ring-shaped end face that comes into contact with a first ring-shaped end face of the first side of the housing, and the first electronic pen main body section includes a first stepped portion on a coupling area between the first tip portion and the first axial portion,
the first electronic pen main body section is coupled to the housing with the second ring-shaped end face of the first electronic pen main body section and the first ring-shaped end face on the first side of the housing in contact,
the second electronic pen main body section further includes:
a second axial portion that is put into the second hollow portion of the housing via the second opening of the housing; and
a second tip portion that is coupled to the second axial portion and externally exposed from the second opening of the housing,
a diameter of the second tip portion of the second electronic pen main body section is larger than a diameter of the second opening, a coupling side of the second tip portion includes a fourth ring-shaped end face that comes into contact with a third ring-shaped end face of the second side of the housing, and the second electronic pen main body section includes a second stepped portion on a coupling area between the second tip portion and the second axial portion, and the second electronic pen main body section is coupled to the housing with the fourth ring-shaped end face of the second electronic pen main body section and the third ring-shaped end face on the second side of the housing in contact.

13. The electronic pen of claim 12, wherein the first hollow portion and the second hollow portion of the housing are in fluid communication.

14. The electronic pen of claim 12, wherein the first electronic pen main body section inputs a pointing position to a position detector, and the second electronic pen main body section, in operation, provides a signal to the position detector, the position detector performing a function, based on the signal, that deletes the pointing position input by the first electronic pen main body section to the position detector.

15. An electronic pen main body section coupled to a housing on a side of the housing in an axial direction of the housing, the housing including an opening in the side of the housing, and a first hollow portion that extends in the axial direction and that is in fluid communication with the opening, the electronic pen main body section comprising:

a second hollow portion that extends in the axial direction and in which a plurality of electronic pen components is accommodated;

an axial portion that is put into the first hollow portion of the housing via the opening of the housing; and a tip portion that is coupled with the axial portion and externally exposed from the opening of the housing, wherein:

a diameter of the tip portion is larger than a diameter the opening, a coupling side of the tip portion includes a second ring-shaped end face that comes into contact with a first ring-shaped end face on the side of the housing that includes the opening, and the electronic pen main body section includes a stepped portion on a coupling area between the tip portion and the axial portion, and the electronic pen main body section is coupled with the housing with the second ring-shaped end face and the first ring-shaped end face on the side of the housing in contact.

16. The electronic pen main body section of claim 15, wherein the second hollow portion of the electronic pen main body section extends from the tip portion to the axial portion, and the electronic pen components are accommodated in the second hollow portion and span across the axial portion and the tip portion.

17. The electronic pen main body section of claim 16, wherein the electronic pen components include a coil wound around a magnetic core, and part of the magnetic core and the coil is accommodated in an area of the tip portion of the second hollow portion.

18. The electronic pen main body section of claim 15, wherein the tip portion is tapered such that the farther the tip portion is away from the coupling side with the axial portion in the axial direction, the smaller the tip portion is than the coupling side with the axial portion.

* * * * *